US011782962B2

(12) United States Patent
Zhang et al.

(10) Patent No.: US 11,782,962 B2
(45) Date of Patent: Oct. 10, 2023

(54) TEMPORAL CONTEXT-AWARE REPRESENTATION LEARNING FOR QUESTION ROUTING

(71) Applicant: NEC Laboratories America, Inc., Princeton, NJ (US)

(72) Inventors: Xuchao Zhang, Elkridge, MD (US); Wei Cheng, Princeton Junction, NJ (US); Haifeng Chen, West Windsor, NJ (US); Bo Zong, West Windsor, NJ (US)

(73) Assignee: NEC Corporation

( * ) Notice: Subject to any disclaimer, the term of this patent is extended or adjusted under 35 U.S.C. 154(b) by 611 days.

(21) Appl. No.: 16/936,541

(22) Filed: Jul. 23, 2020

(65) Prior Publication Data
US 2021/0049213 A1 Feb. 18, 2021

Related U.S. Application Data

(60) Provisional application No. 62/885,799, filed on Aug. 12, 2019.

(51) Int. Cl.
*G06F 16/332* (2019.01)
*G06F 16/9032* (2019.01)
*G06F 16/9035* (2019.01)
*G06F 18/214* (2023.01)

(52) U.S. Cl.
CPC ...... *G06F 16/3329* (2019.01); *G06F 16/9035* (2019.01); *G06F 16/90332* (2019.01); *G06F 18/214* (2023.01)

(58) Field of Classification Search
None
See application file for complete search history.

(56) References Cited

U.S. PATENT DOCUMENTS

| | | | |
|---|---|---|---|
| 2009/0162824 A1 | 6/2009 | Heck | |
| 2010/0070554 A1 | 3/2010 | Richardson et al. | |
| 2011/0307498 A1 | 12/2011 | McFarlane et al. | |
| 2013/0304730 A1 | 11/2013 | Zhou | |
| 2015/0017616 A1 | 1/2015 | Rachitsky et al. | |
| 2016/0196265 A1* | 7/2016 | Allen | G06F 16/248 707/734 |
| 2017/0017694 A1 | 1/2017 | Roytman et al. | |
| 2017/0133014 A1 | 5/2017 | Sharifi et al. | |
| 2018/0089305 A1* | 3/2018 | Croutwater | G06F 16/3334 |
| 2018/0341871 A1* | 11/2018 | Maitra | G06N 3/042 |

* cited by examiner

*Primary Examiner* — Antim G Shah
(74) *Attorney, Agent, or Firm* — Joseph Kolodka

(57) ABSTRACT

A method for employing a temporal context-aware question routing model (TCQR) in multiple granularities of temporal dynamics in community-based question answering (CQA) systems is presented. The method includes encoding answerers into temporal context-aware representations based on semantic and temporal information of questions, measuring answerers expertise in one or more of the questions as a coherence between the temporal context-aware representations of the answerers and encodings of the questions, modeling the temporal dynamics of answering behaviors of the answerers in different levels of time granularities by using multi-shift and multi-resolution extensions, and outputting answers of select answerers to a visualization device.

20 Claims, 7 Drawing Sheets

Ranking Metric Function

$$\sigma(Q, t, z) = \left(\mathrm{Avg}_{\mathrm{pool}}(Q) \oplus t\right) \cdot z^T$$

Temporal Context-Aware Embedding

$$z_{k+1} = \mathrm{softmax}\left(\frac{\left(\mathrm{Avg}_{\mathrm{pool}}(Q) \oplus t_k\right)W_Q(z_k W_1)^T}{\sqrt{d}}\right) z_k W_2$$

Ranking Loss

$$\mathcal{L}_r = \sum_{q_i \in Q} \left\{ \sum_{\substack{z^+ \in \Phi_i \\ z^- \notin \Phi_i}} \max\left(\sigma(Q_i, t_i, z^+) - \sigma(Q_i, t_i, z^-) + \alpha_p, 0\right) \right.$$

$$\left. + \sum_{z^+ \in \Phi_i} \max\left(\sigma(Q_i, t_i, z^*) - \sigma(Q_i, t_i, z^+) + \alpha_c, 0\right) \right\},$$

Temporal Loss Function between Neighboring Time Shifts

$$\mathcal{L}_s = \sum_{q_i \in Q} \left\{ \sum_{z^+ \in \Phi_i} \sum_{k=1}^{K} \max\left(\sigma(Q_i, t_i, z^+_{k-1}) - \sigma(Q_i, t_i, z^+_k) + \alpha_s, 0\right) \right\}$$

FIG. 7

TEMPORAL CONTEXT-AWARE REPRESENTATION LEARNING FOR QUESTION ROUTING

RELATED APPLICATION INFORMATION

This application claims priority to Provisional Application No. 62/885,799, filed on Aug. 12, 2019, the contents of which are incorporated herein by reference in their entirety.

BACKGROUND

Technical Field

The present invention relates to community-based question answering (CQA) and, more particularly, to methods and systems for temporal context-aware representation learning for question routing.

Description of the Related Art

Community-based question answering (CQA) has become a popular web service where users can exchange information in the form of questions and answers. However, the rapid growth of CQA sites has led to a gap between the posted questions and the potential respondents. This causes question raisers to wait hours or even days for answers and makes respondents feel overwhelmed about selecting suitable questions to answer from the large number of open candidates. The question routing problem, a task to bridge the gap in CQA sites, aims to allocate the answerers more efficiently and find related questions for the answerers. Question routing (QR) aims at recommending newly posted questions to potential answerers who are most likely to answer the questions. The existing approaches that learn users' expertise from their past question-answering activities usually suffer from challenges in two aspects, that is, multi-faceted expertise and temporal dynamics in the answering behavior.

SUMMARY

A computer-implemented method for employing a temporal context-aware question routing model (TCQR) in multiple granularities of temporal dynamics in community-based question answering (CQA) systems is presented. The method includes encoding answerers into temporal context-aware representations based on semantic and temporal information of questions, measuring answerers expertise in one or more of the questions as a coherence between the temporal context-aware representations of the answerers and encodings of the questions, modeling the temporal dynamics of answering behaviors of the answerers in different levels of time granularities by using multi-shift and multi-resolution extensions, and outputting answers of select answerers to a visualization device.

A non-transitory computer-readable storage medium comprising a computer-readable program is presented for employing a temporal context-aware question routing model (TCQR) in multiple granularities of temporal dynamics in community-based question answering (CQA) systems, wherein the computer-readable program when executed on a computer causes the computer to perform the steps of encoding answerers into temporal context-aware representations based on semantic and temporal information of questions, measuring answerers expertise in one or more of the questions as a coherence between the temporal context-aware representations of the answerers and encodings of the questions, modeling the temporal dynamics of answering behaviors of the answerers in different levels of time granularities by using multi-shift and multi-resolution extensions, and outputting answers of select answerers to a visualization device.

A system for employing a temporal context-aware question routing model (TCQR) in multiple granularities of temporal dynamics in community-based question answering (CQA) systems is presented. The system includes a memory and one or more processors in communication with the memory configured to encode answerers into temporal context-aware representations based on semantic and temporal information of questions, measure answerers expertise in one or more of the questions as a coherence between the temporal context-aware representations of the answerers and encodings of the questions, model the temporal dynamics of answering behaviors of the answerers in different levels of time granularities by using multi-shift and multi-resolution extensions, and output answers of select answerers to a visualization device.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein:

FIG. 7 is a block/flow diagram of equations employed in an exemplary method for the TCQR, in accordance with embodiments of the present invention.

DETAILED DESCRIPTION OF PREFERRED EMBODIMENTS

Community-based question answering (CQA) has become a popular web service where users can exchange information in the form of questions and answers. For instance, Quora, one of the most popular question answering sites, generates a question every 1.84 seconds and had accumulated up to 38 million questions as of January 2019. However, the rapid growth of CQA sites has led to a gap between the posted questions and the potential respondents. This causes question raisers to wait hours or even days for answers and makes respondents feel overwhelmed about selecting suitable questions to answer from a large number of open candidates. The question routing problem, a task to bridge the gap in CQA sites, aims to allocate the answerers more efficiently and find related questions for the answerers.

Figure 1:
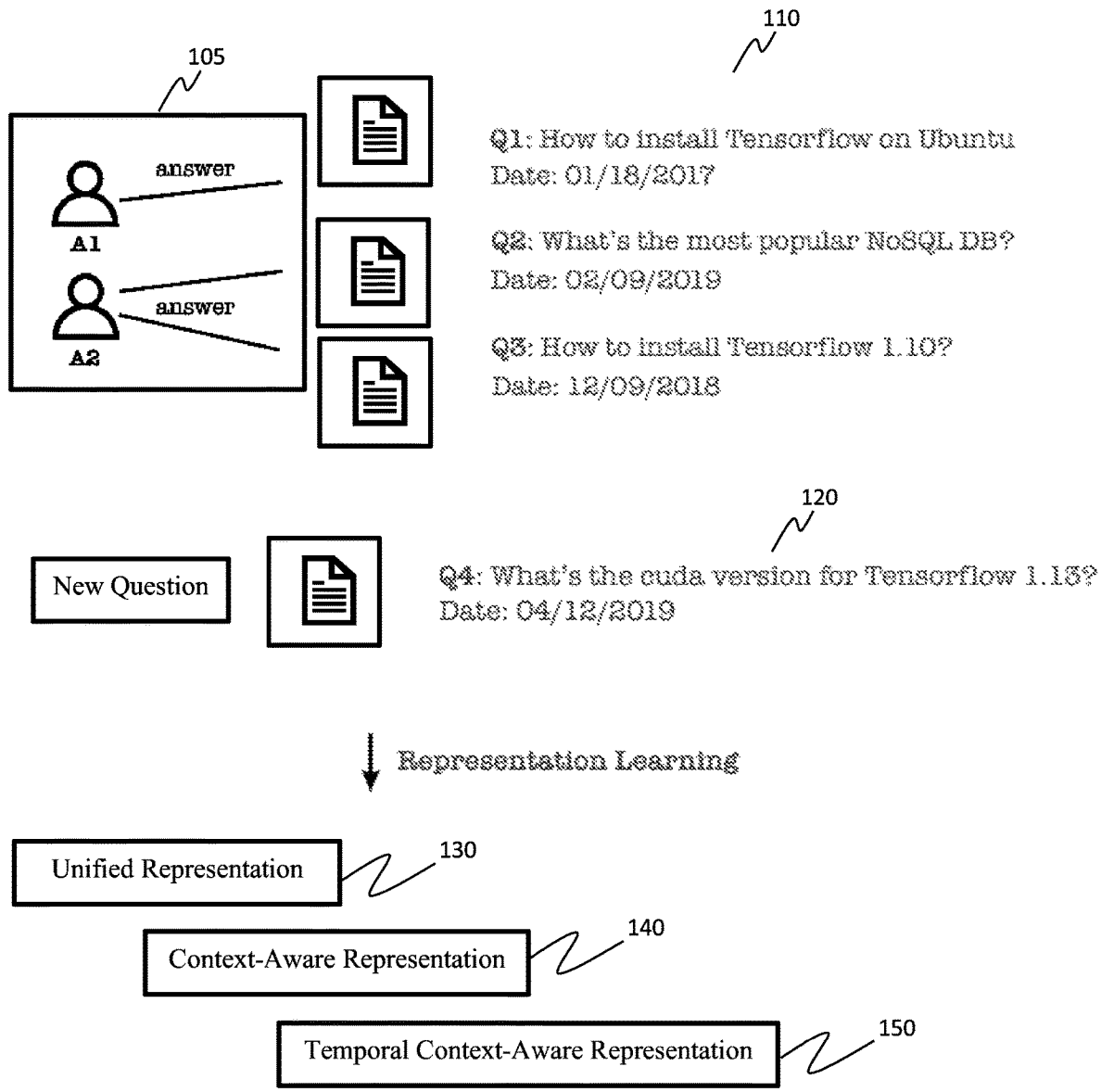
FIG. 1 is a block/flow diagram of a toy example of question routing task with two answerers and three questions in two expertise domains, in accordance with embodiments of the present invention.

FIG. 1 illustrates a toy example of question routing in terms of two answerers 105 and three questions 110. Answerers A1 and A2 answered "Tensorflow installation" related questions Q1 and Q3, respectively. Also, A2 is capable of answering the "NoSQL database" question. If there is a new question Q4 (120) related to "Tensorflow," both A1 and A2 who have equivalent expertise should be recommended. However, if considering the temporal factor, A2 should be recommended since Q3 answered by A2 has more temporal closeness than A1. Moreover, since the questions in the task are described by natural language, the question routing task can be easily extended to other expert finding tasks described by text, such as bug triaging and expert finding in social networks.

Existing question routing approaches usually focus on modeling user expertise into a unified embedding vector by the semantics of the questions they answered. However, these approaches suffer from the following challenges.

Multifaceted expertise: Most of the users on CQA sites have multifaceted expertise and are capable of answering questions in different domains. For instance, the answerer A2 in FIG. 1 can take the questions related to both "Tensorflow installation" and "NoSQL database." Multi-faceted expertise cannot be explicitly modeled by the existing approaches that use a unified representation 130 for answerers with multiple expertise. The embedding of answerer A2 can be trained by minimizing the sum of the distances of A2–Q2 and A2–Q3 when unified representation 130 is used for answerer A2. Since answerer A1 only answered question 1, A1's embedding is close to Q1 and Q4. Thus, A1 is recommended in this case, which is contrary to the truth that both A1 and A2 have equivalent expertise on question 4 regarding Tensorflow-related questions.

Temporal dynamics in the answering behavior: The temporal dynamics of the answerers' interests are based on the observation that answerers may have prompt expertise or willingness to answer a question that they answered recently. Such approaches are referred to as context-aware representation 140 and temporal content-aware representation 150. Answerer A2, who answered the "Tensorflow" question recently, is more likely to answer the new Tensorflow-related questions again than answerer A1, who answered a similar question two years ago. Moreover, the granularity of the temporal dynamics is usually hard to define due to the characteristics of the answerers. For example, some answerers can keep answering questions for years, but others lose interest quickly.

In order to address the technical challenges above, the exemplary embodiments introduce a temporal context-aware representation learning model for the question routing problem (TCQR). Specifically, the answerers are encoded into temporal context-aware representations in the context of the semantic and temporal information of the questions. Then the expertise of the answerers on certain questions are measured as a coherence between the context-aware representations of the answerers and the encodings of the questions. Moreover, multi-shift and multi-resolution extensions are introduced to model the temporal dynamics of answering behaviors in different levels of time granularities. In addition, new triplet loss functions based on answerers' ranking order and temporal dynamics are introduced to learn the users' answering behavior.

The exemplary features are summarized as follows: Design a temporal context-aware attention model to learn the answerer representation. Specifically, instead of representing the answerer with a unified embedding, the exemplary model learns the answerer representation in the context of a question's semantic and temporal information, which helps to model multi-faceted expertise. The exemplary embodiments introduce an approach to model temporal dynamics by multi-shift and multi-resolution settings. In particular, the multi-shift module is designed to model the temporal impact on neighboring time periods and the multi-resolution setting is designed to control the temporal impact on both fine and coarse granularities.

Recently, context-aware embedding has been utilized in many areas such as sentiment analysis, network analysis, recommending systems, and multimedia retrieval. For instance, one method proposed a context-aware embedding approach for the targeted aspect-based sentiment analysis problem by utilizing a sparse coefficient vector to adjust the context-aware embedding of target and aspect. Another method learned context-aware network embedding for a relation model in network analysis to represent the diverse roles of nodes. Yet another method proposed a context-aware recommendation model by capturing the contextual information of documents. However, such approaches consider a single modality of context, which cannot be applied to the multi-modal contexts for both question semantics and temporal information of the exemplary embodiments of the present invention. Moreover, the hierarchical context-aware attention extension in multi-shift and multi-resolution enables the exemplary methods of the present invention to model the temporal impact on neighboring periods in fine and coarse granularities.

The required notation is presented and the problem of question routing is formulated in community-based question answering (CQA) sites.

A CQA dataset that conserves all the question-answer sessions can be represented by the following sets:

Question set $Q=\{q_1, q_2, \ldots, q_n\}$, where n denotes the number of questions. Each question $q_i$ can be represented as a tuple $q_i=(c_i, t_i)$, where $c_i$ is the question content in natural language and $t_i$ is the timestamp when the question was raised.

Answerer set $A=\{a_1, a_2, \ldots, a_m\}$, where m is the number of answerers. Each answerer $a_i$ is represented by a low-dimensional embedding for the question routing task.

Question-Answer Session set $S=\{s_1, s_2, \ldots, s_n\}$, where n is the total number of questions. Each question-answer session $s_i$ includes all the answer information related to question $q_i$, and it can be represented as a tuple $s_i=(qi, \Phi i, ai)$, where the answerer set $\Phi_i \subseteq A$ denotes all the answerers who answered the question $q_i$ and $a_i \in \Phi_i$ is the answerer who gave the unique accepted answer.

For example, if a question $q_i$ raised on Jul. 16, 2019 and answered by users $a_1$, $a_4$ and $a_6$, where $a_4$ is the answerer who provided the accepted answer, the question can then be represented as $q_i$=((CONTENT OF QUESTION), Jul. 16, 2019) and its question-answer session $s_i$ is denoted by $s_i=(q_i, \{a_1, a_4, a_6\}, a_4)$. To model the temporal dynamics of the answering behavior, the following definitions of time periods are presented. First, the exemplary methods use different time resolutions to split the whole time period into units where the definition of time resolution is shown as follows:

Definition of Time Resolution: time resolution is the granularity to split a time period into multiple units. For instance, the time period from Jan. 1, 2019 to Jul. 1, 2019 can be split into 26 units by time resolution 7 days, where each time unit has 7 days except for the last time unit, which has 6 days.

Then the exemplary methods use the function $\delta(t)$ to represent the index of time unit belonging to time t. Following the previous example that splits the time period from Jan. 1, 2019 to Jul. 1, 2019, $\delta(t1)=1$ and $\delta(t2)=2$ when timestamp $t_1$ and $t_2$ are "Jan. 2, 2019" and "Jan. 9, 2019". Then the time shift between two timestamps can be defined as follows:

Definition of Time Shift: time shift $\Delta(ti, tj)$ between timestamp ti and tj is defined by $|\delta(ti)-\delta(tj)|$. For instance, if ti and tj are "Jan. 2, 2019" and "Jan. 17, 2019" respectively, then the time shift between them is 2. Based on the definition of time resolution and shift, the exemplary methods can model the temporal impact on neighboring time units in fine and coarse granularities when applying ti as the time of raising the question. Using the above notations, the exemplary methods define temporal context-aware question routing as the following:

Given question set Q, answerer set A and a new question query $\hat{q}=(\hat{c}, \hat{t})$ where $\hat{c}$ and $\hat{t}$ are the content and raising timestamp of the new question, the question routing problem is to compute the ranking scores for each answerer $a \in A$ and recommend the answerer with the highest ranking score as the predicted provider of the "accepted answer."

The architecture of the model is now presented and then the details of temporal context-aware attention and temporal dynamics modeling via multi-shift and multi-resolution modules are provided.

Figure 2:
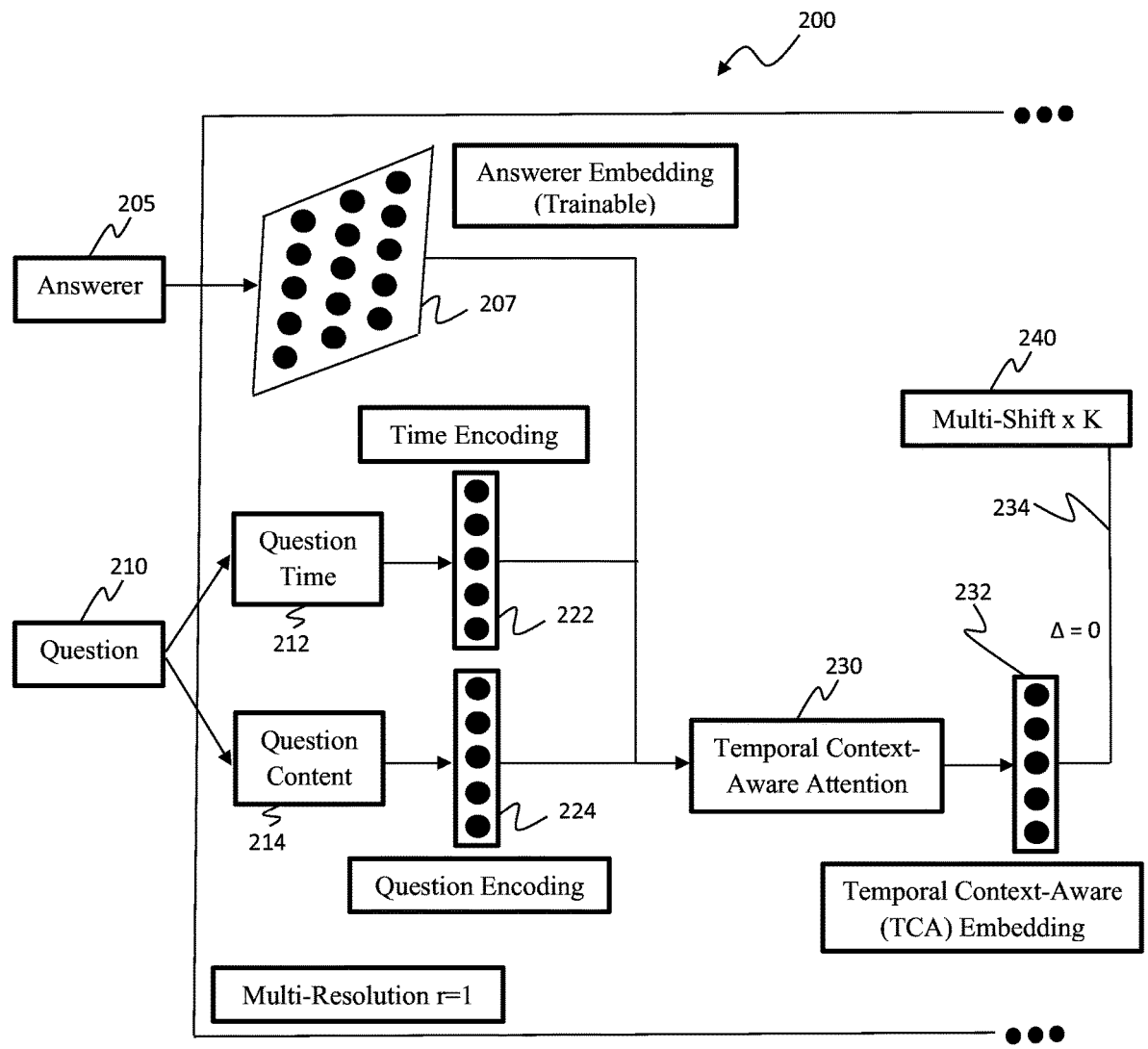
FIG. 2 is a block/flow diagram of a first section of an exemplary architecture of a temporal context-aware question routing (TCQR) model, in accordance with embodiments of the present invention.
Figure 3:
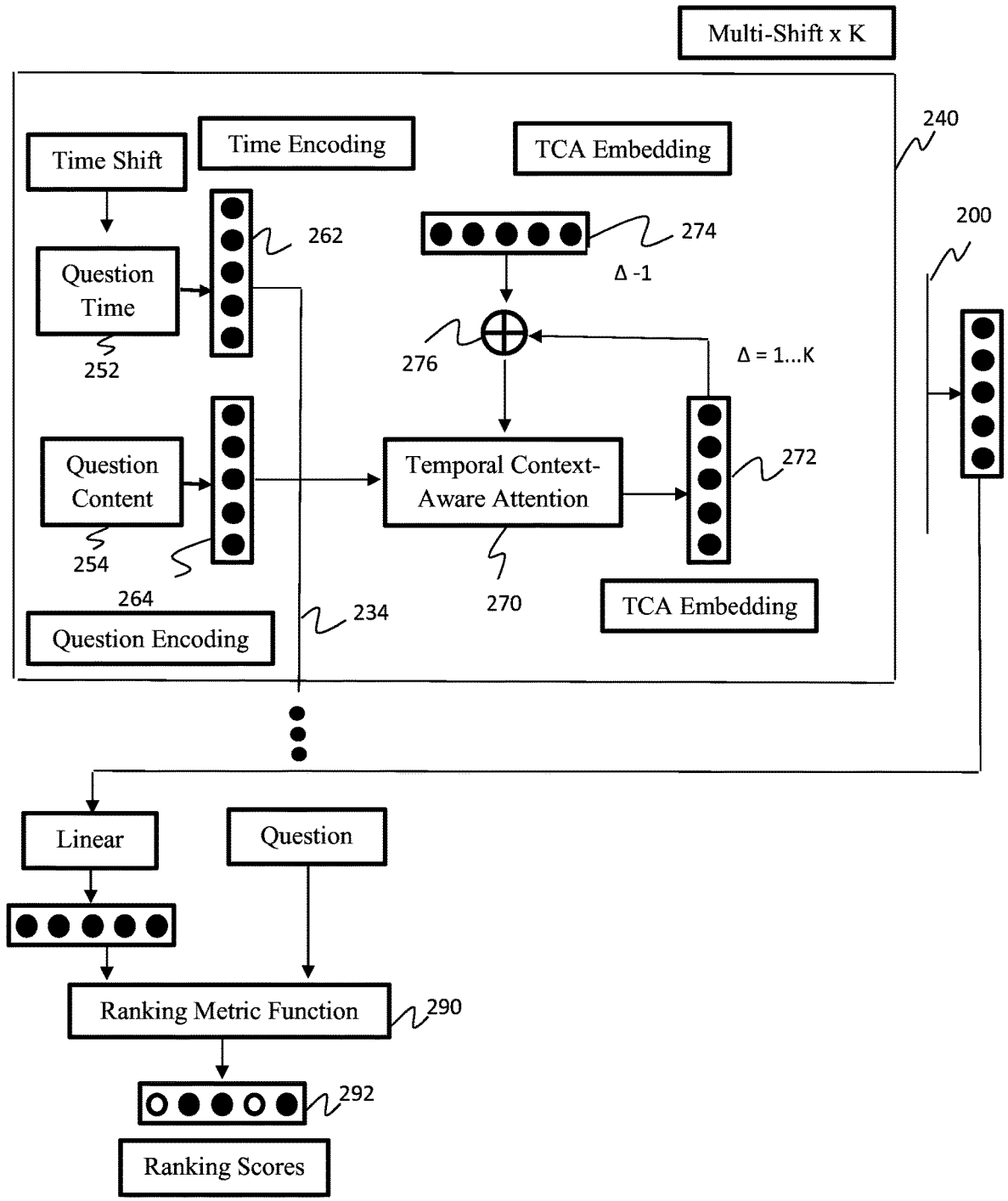
FIG. 3 is a block/flow diagram of a second section of the exemplary TCQR model, in accordance with embodiments of the present invention.

The exemplary temporal Context-aware Question Routing model (TCQR) is a multi-layer deep neural network integrating with temporal context-aware attention as well as multi-shift and multi-resolution temporal dynamics modules or extensions. The overall architecture 200 is shown in FIGS. 2-3. The inputs of the model include both questions 210 and answerers 205.

Each answerer 205 is represented by the embedding Matrix $U \in \mathcal{R}^{p \times d}$, where p is a hyper-parameter to control the scale of user expertise and d is the dimension for each user expertise.

The answerer embedding 207 is randomly initialized and is trainable by the exemplary model. The question input includes both the question content c (214) and question raising timestamp t (212). The content of the question is encoded (224) by a pre-trained deep bidirectional Transformers model, that is, Bidirectional Encoder Representations from Transformers (BERT). The encoding output by BERT is denoted by $Q \in \mathcal{R}^{l \times d}$, where l is the number of words in a question. By default, the exemplary methods choose the dimension of word that is the same value as the dimension of the answerer's embedding and fix the embedding of question content untrainable for fine-tuning. The question raising time is encoded into a unique representation vector $t \in \mathcal{R}^d$ by the time encoding module 222, where the representation is also used to reflect the ordered sequence of the timeline.

The content encoding 224 and time encoding 222 of question and answerer embedding will be used as the inputs of the Temporal Context-Aware (TCA) attention module 230, which aims to generate the answerer embedding $z \in \mathcal{R}^d$ (232) in the context of the question and its corresponding raising time. Then, the exemplary methods employ the multi-shift and multi-resolution extensions 240 on the temporal context-aware embedding to model the temporal dynamics on neighboring time periods via different granularities. The multi-shift and multi-resolution extensions are described in FIG. 3, where FIGS. 2 and 3 are connected by 234. After that, the exemplary methods use the ranking metric function $\sigma$ (290) to quantify the quality of answerer a (292) for answering question q, which is defined as follows:

$$\sigma(Q,t,z)=(\text{Avg}_{pool}(Q) \oplus t) \cdot z^T,$$

where Q and t are the encoding of the question content (264) and question raising time (252), respectively. The temporal context-aware embedding (274) of the answerer is denoted by z, and $\oplus$ (276) is the operator to combine the question content (254) and question time (252). By default, the exemplary methods use the "add" operator since it has the similar performance as concatenation operator but takes less computational memory space. Then the coherence score will be utilized in the training process. A temporal context-aware attention 270 is employed to generate TCA embedding 272 in the context of the question and its corresponding raising time.

To encode the question raising timestamp into a low-dimensional representation $t \in \mathcal{R}^d$, the exemplary methods employ a traditional position encoding method (264), and the value of its k-th position in t is defined as follows:

$$t(k, j) = \begin{cases} \sin(k/10000^{j/d}) & \text{if } j = 2i-1, i \in \mathcal{Z}^+ \\ \cos(k/10000^{j/d}) & \text{if } j = 2i, i \in \mathcal{Z}^+, \end{cases}$$

where d is the dimension of the time encoding 262 and $\mathcal{Z}^+$ represents the positive integers starting from one. An example of time encodings from September 2008 to April 2019 with the time unit of 30 days can be discussed. Each row represents the time encoding for each time unit with 768 dimensions. The time encoding method satisfies the following two properties, which are needed for the temporal dynamics modeling, uniqueness, the value of time encoding is unique when it represents different timestamps, and sequential ordering. The L2 norm distance between time encodings can be used to reflect the temporal distance.

For example, when $t_1$, $t_2$, $t_3$ represent the dates Apr. 1, 2019, May 1, 2019, and Jun. 1, 2019, respectively, the following property is satisfied:

$$\|t_1-t_2\|_2 \leq \|t_1-t_3\|_2.$$

First, most of the existing approaches assume the embeddings of two answerers are similar if both of them answered similar questions. However, this assumption cannot always be true when answerers have multi-faceted expertise. For example, if two answerers $a_1$ and $a_2$ are capable of answering questions in one area, according to the assumption, their representation u and v should be similar: $u \approx v$.

However, if $a_1$ can also answer questions in a different area but $a_2$ cannot, their representation should be considered as different. Hence, in the exemplary model, the exemplary methods assume the embedding of an answerer is not unified but varied for different questions. Specifically, the embeddings of the two answerers are similar under the context of question q, $u^{(q)} \approx v^{(q)}$ when both of them answered the question, where $u^{(q)}$ and $v^{(q)}$ represent the two answerers' embeddings in the context of question q.

Figure 4:
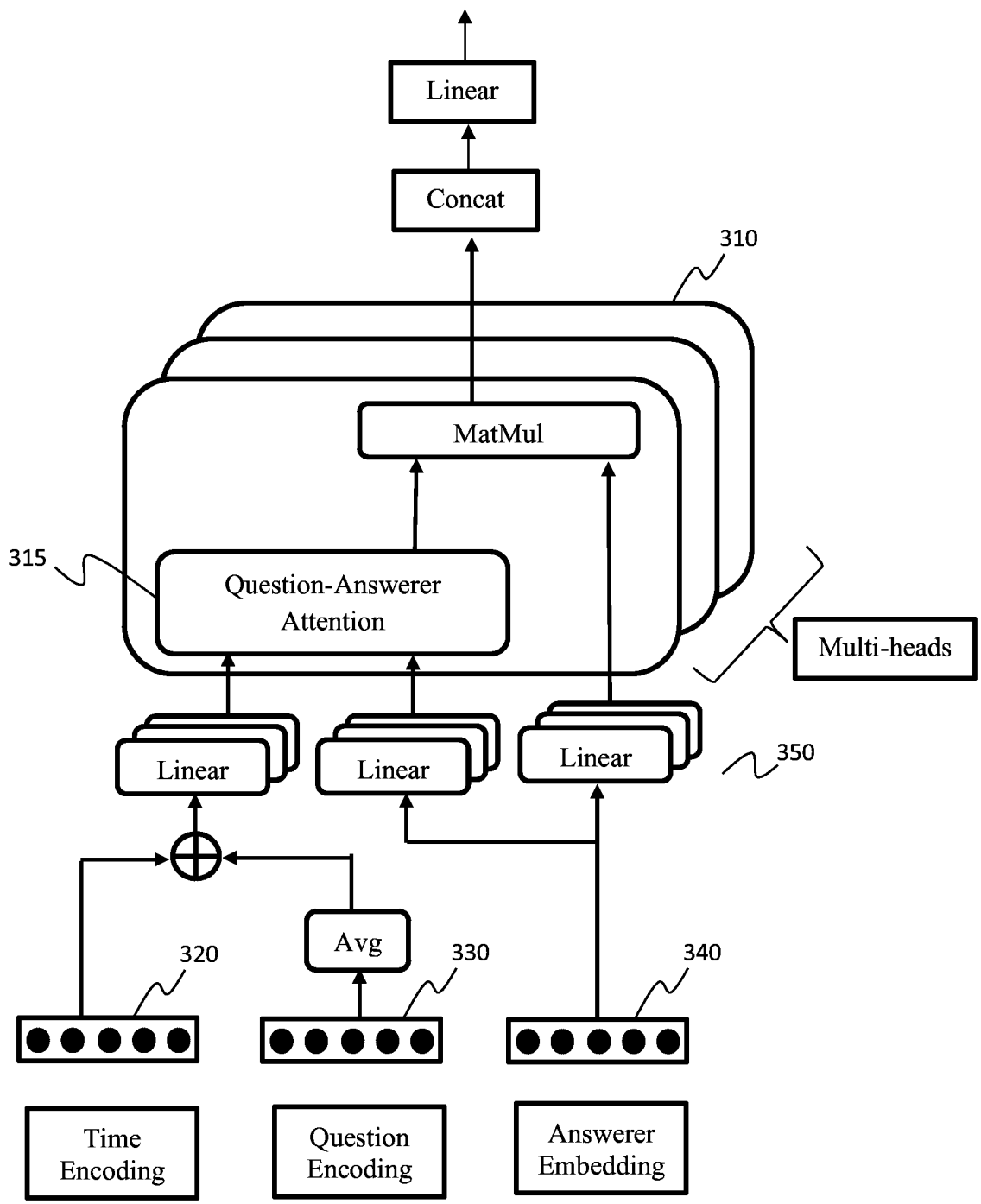
FIG. 4 is a block/flow diagram of an exemplary temporal context-aware attention model, in accordance with embodiments of the present invention.

Following a multi-headed self-attention framework, the multi-headed temporal context-aware attention module 310 is illustrated in FIG. 4. Specifically, the exemplary methods combine the time encoding 320 and question content encoding 330 as the context to learn the attention 315 between question and answerer. After that, the exemplary methods apply the attention to the answerer embedding 340 for generating the temporal context-aware embedding $z_k$ in terms of the k-th time shift, which is represented as follows.

$$z_{k+1} = softmax\left(\frac{(Avg_{pool}(Q) \oplus t_k)W_Q(z_k W_1)^T}{\sqrt{d}}\right) z_k W_2,$$

where $W_Q$, $W_1$, $W_2 \in \mathcal{R}^{d \times d}$ are the weights for the linear components 350. The embedding of the question content is denoted by $Q \in \mathcal{R}^{l \times d}$ and $t_k \in \mathcal{R}^d$ represents the encoding of the timestamp in the k-th time shift. $z_k$ denotes the embedding of the answerer that has separate representations in different values of time shift k. In particular, when k=0, $z_0$ equals to the initial answerer embedding $U \in \mathcal{R}^{p \times d}$ without context information. Then the attention learned is a d×k matrix to show the relation between the question's semantic features and the answerer's expertise. When k≥1, the exemplary methods have $z_k \in \mathcal{R}^d$ to represent the temporal context-aware embedding in terms of time shift k. Then the attention learned from question-answerer attention 315 is a scalar to show the importance of each time shift.

For the multi-shift extension, the exemplary methods use a different time encoding with a different time shift Δ from 1 to K, where K is set to the maximum number of time shifts modeled for temporal impact. For example, when Δ=1 and the question raising timestamp is t, the time encodings of the time units δ(t)−1 and δ(t)+1 will be combined as the input of TCA Attention module. In particular, the shifted time encodings are combined as the sum of time encoding of the backward time unit and forward time unit.

Different from the TCA attention module used in the first layer, the exemplary methods use a residual block to enable a shortcut connection between different time-shifted embeddings.

Specifically, the exemplary methods employ the context-aware embedding input of the k-th time-shift layer $z_k^{(in)}$ as the sum of both the input and output of the (k−1) layer:

$$z_k^{(in)} \leftarrow z_{k-1}^{(in)} + z_{k-1}^{(out)}.$$

For the multi-resolution extension, the exemplary methods can choose different time resolutions to split the time period into multi-grained units. For each resolution, the time encoding includes the temporal information in diverse levels of time granularities. After the multi-shift temporal context-aware embedding layers, the exemplary methods combine the context-aware embedding $z_k^{(r_i)}$ for each time resolution together, where the superscript $r_i$ represents the size of the i-th time resolution. Then the exemplary methods employ a fully connected layer to project combined embeddings into a d-dimensional embedding vector.

To train the model, the exemplary methods first apply a ranking triplet loss function to learn the relative rank between positive samples (users answered the question) and negative samples (users did not answer the question). Moreover, to distinguish the answerer who provided the accepted answer from the other answerers in the same question, the exemplary methods also add an additional ranking loss term between them.

The ranking loss is given as follows:

$$\mathcal{L}_r = \sum_{q_i \in Q} \left\{ \sum_{\substack{z^+ \in \Phi_i \\ z^- \notin \Phi_i}} \max(\sigma(Q_i, t_i, z^+) - \sigma(Q_i, t_i, z_k^-) + \alpha_p, 0) + \sum_{z^+ \in \Phi_i} \max(\sigma(Q_i, t_i, z^*) - \sigma(Q_i, t_i, z^+) + \alpha_c, 0) \right\},$$

where $\Phi_i$ denotes the users who answered the question $q_i = (Q_i, t_i) \in Q$. The variables $z^+$, $z^-$ and $z^*$ represent the embedding of the positive answerers, negative answerers, and answerer who provided the accepted answer, respectively. The exemplary methods employ a margin value $\alpha_p$ to control the distance between positive and negative answerers and use a margin value $\alpha_c$ for the distance between positive answerers and the user who give the accepted answer.

Moreover, to learn the observation that more recent answering behaviors have higher impact on the recommendation of answerers, the exemplary methods introduce a new temporal loss function between the neighboring time shifts, as shown below.

$$\mathcal{L}_s = \sum_{q_i \in Q} \left\{ \sum_{z^+ \in \Phi_i} \sum_{k=1}^{K} \max(\sigma(Q_i, t_i, z_{k-1}^+) - \sigma(Q_i, t_i, z_k^+) + \alpha_s, 0) \right\}$$

where k is the index of time shift and K is the total number of time shifts. $z_k^+$ represents the temporal context-aware embedding of answerers after the k-th time shift. The exemplary methods set the margin parameter $\alpha_s$ to one.

Then the exemplary methods combine both the ranking loss and time shift loss together to generate the total loss $\mathcal{L}$ as follows: $\mathcal{L} = \mathcal{L}_r + \lambda \mathcal{L}_s$, where λ is a parameter to balance the two loss functions and is set to 0.5 by default.

In conclusion, the exemplary methods introduce a temporal context-aware question routing model (TCQR) in community-based question answering (CQA) systems. The exemplary model learns the answerers' representation in the context of both the semantic and temporal information to handle the multi-faceted expertise of answerers in CQA system. To model the temporal dynamics of answering behavior, the exemplary methods extend the temporal context-aware attention model into its multi-shift and multi-resolution extensions, which enable the model to learn the temporal impact on the neighboring time periods in multiple time granularities. Stated differently, the exemplary embodiments of the present invention introduce a temporal context-aware model in multiple granularities of temporal dynamics that concurrently address the above challenges. Specifically, the temporal context-aware attention characterizes the answerer's multi-faceted expertise in terms of the questions' semantic and temporal information, concurrently or simultaneously. Moreover, the design of the multi-shift and multi-resolution modules or extensions enables the model to handle temporal impact on different time granularities.

Figure 5:
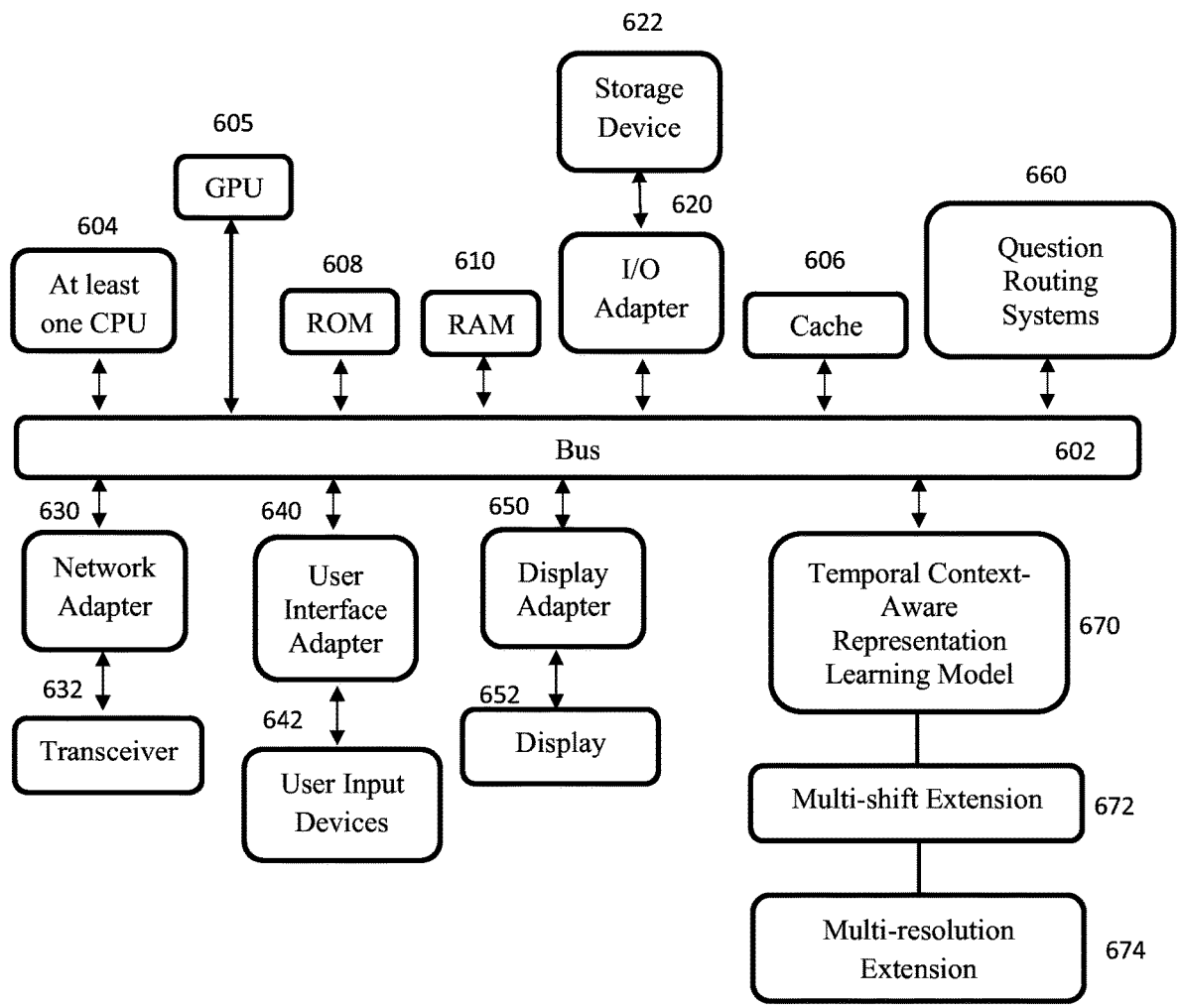
FIG. 5 is block/flow diagram of an exemplary processing system for the TCQR, in accordance with embodiments of the present invention.

FIG. 5 is block/flow diagram of an exemplary processing system for the TCQR, in accordance with embodiments of the present invention.

The processing system includes at least one processor or processor device (CPU) 604 and a graphics processing unit (GPU) 605 operatively coupled to other components via a system bus 602. A cache 606, a Read Only Memory (ROM) 608, a Random Access Memory (RAM) 610, an input/output (I/O) adapter 620, a network adapter 630, a user interface adapter 640, and a display adapter 650, are operatively coupled to the system bus 602. Question routing systems 660 can be employed via the bus 602. The question routing systems 660 can employ a temporal context-aware representation learning model 670 by utilizing a multi-shift extension 672 and a multi-resolution extension 674.

A storage device 622 is operatively coupled to system bus 602 by the I/O adapter 620. The storage device 622 can be any of a disk storage device (e.g., a magnetic or optical disk storage device), a solid state magnetic device, and so forth.

A transceiver 632 is operatively coupled to system bus 602 by network adapter 630.

User input devices 642 are operatively coupled to system bus 602 by user interface adapter 640. The user input devices 642 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 642 can be the same type of user input device or different types of user input devices. The user input devices 642 are used to input and output information to and from the processing system.

A display device 652 is operatively coupled to system bus 602 by display adapter 650.

Of course, the processing system may also include other elements (not shown), as readily contemplated by one of skill in the art, as well as omit certain elements. For example, various other input devices and/or output devices can be included in the system, depending upon the particular implementation of the same, as readily understood by one of ordinary skill in the art. For example, various types of wireless and/or wired input and/or output devices can be used. Moreover, additional processors, processor devices, controllers, memories, and so forth, in various configurations can also be utilized as readily appreciated by one of ordinary skill in the art. These and other variations of the processing system are readily contemplated by one of ordinary skill in the art given the teachings of the present invention provided herein.

Figure 6:
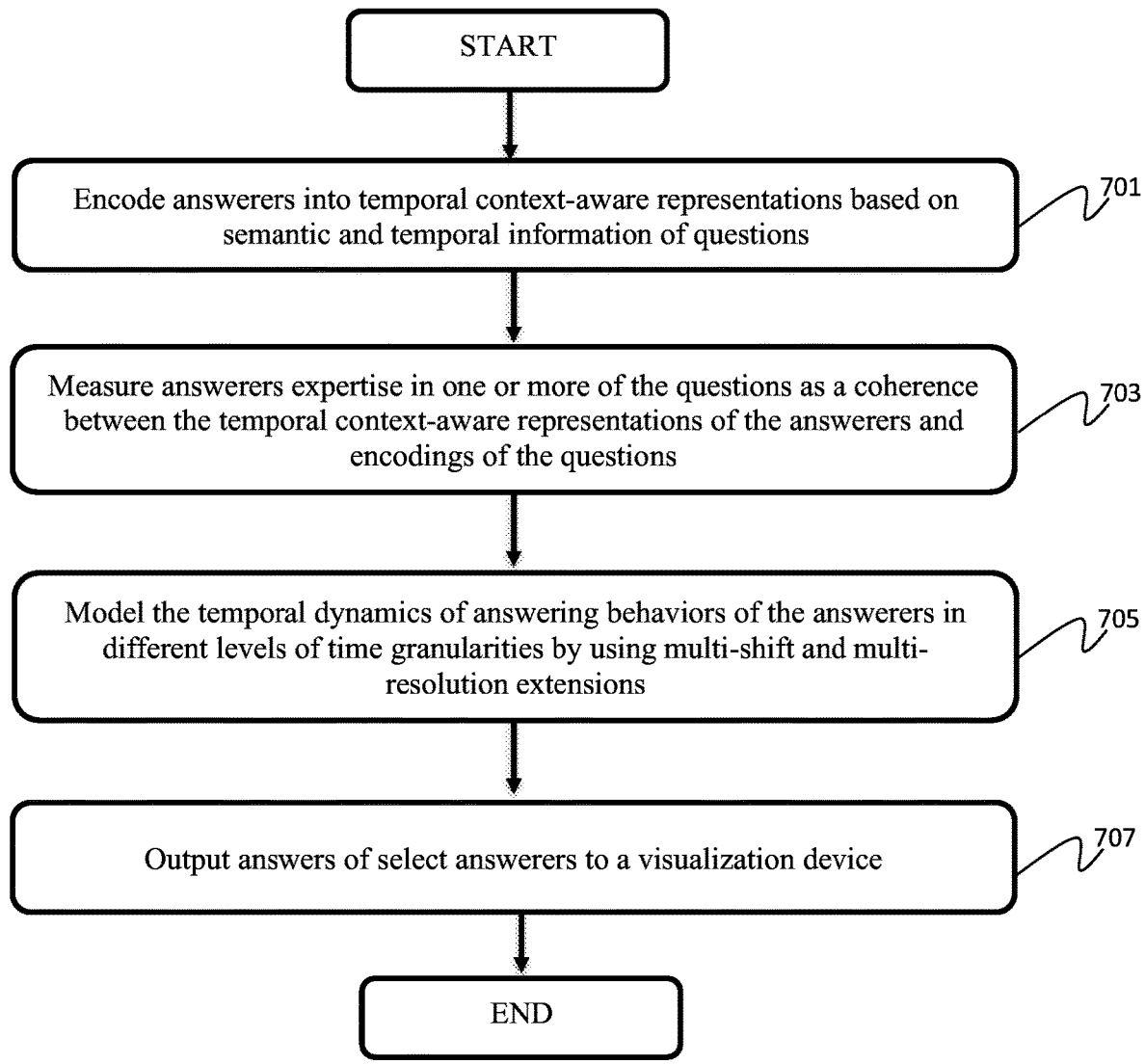
FIG. 6 is a block/flow diagram of an exemplary method for the TCQR, in accordance with embodiments of the present invention.

FIG. 6 is a block/flow diagram of an exemplary method for the TCQR, in accordance with embodiments of the present invention.

At block 701, encode answerers into temporal context-aware representations based on semantic and temporal information of questions.

At block 703, measure answerers expertise in one or more of the questions as a coherence between the temporal context-aware representations of the answerers and encodings of the questions.

At block 705, model the temporal dynamics of answering behaviors of the answerers in different levels of time granularities by using multi-shift and multi-resolution extensions.

At block 707, output answers of select answerers to a visualization device.

FIG. 7 is a block/flow diagram of equations employed in methods for the TCQR, in accordance with embodiments of the present invention.

Equations 800 identify a ranking metric function, a temporal context-aware embedding equation, a ranking loss equation, and a temporal loss function equation between neighboring time shifts.

As used herein, the terms "data," "content," "information" and similar terms can be used interchangeably to refer to data capable of being captured, transmitted, received, displayed and/or stored in accordance with various example embodiments. Thus, use of any such terms should not be taken to limit the spirit and scope of the disclosure. Further, where a computing device is described herein to receive data from another computing device, the data can be received directly from the another computing device or can be received indirectly via one or more intermediary computing devices, such as, for example, one or more servers, relays, routers, network access points, base stations, and/or the like. Similarly, where a computing device is described herein to send data to another computing device, the data can be sent directly to the another computing device or can be sent indirectly via one or more intermediary computing devices, such as, for example, one or more servers, relays, routers, network access points, base stations, and/or the like.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module," "calculator," "device," or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical data storage device, a magnetic data storage device, or any suitable combination of the foregoing. In the context of this document, a computer readable storage medium may be any tangible medium that can include, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the present invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks or modules.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks or modules.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks or modules.

It is to be appreciated that the term "processor" as used herein is intended to include any processing device, such as, for example, one that includes a CPU (central processing unit) and/or other processing circuitry. It is also to be understood that the term "processor" may refer to more than one processing device and that various elements associated with a processing device may be shared by other processing devices.

The term "memory" as used herein is intended to include memory associated with a processor or CPU, such as, for example, RAM, ROM, a fixed memory device (e.g., hard drive), a removable memory device (e.g., diskette), flash memory, etc. Such memory may be considered a computer readable storage medium.

In addition, the phrase "input/output devices" or "I/O devices" as used herein is intended to include, for example, one or more input devices (e.g., keyboard, mouse, scanner, etc.) for entering data to the processing unit, and/or one or more output devices (e.g., speaker, display, printer, etc.) for presenting results associated with the processing unit.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method executed on a processor for employing a temporal context-aware question routing model (TCQR) in multiple granularities of temporal dynamics in community-based question answering (CQA) systems, the method comprising:
   encoding previous answers of answerers into temporal context-aware representations based on semantic and temporal information of questions;
   measuring answerers expertise in one or more of the questions as a coherence between the temporal context-aware representations of the answerers and encodings of the questions;
   modeling the temporal dynamics of answering behaviors of the answerers in different levels of time granularities by using multi-shift and multi-resolution extensions; and
   allocating the answerers more efficiently by finding and directing related questions of the questions to a pertinent answerer of the answerers such that new answers are provided faster and with less computational question routing resources to significantly reduce a time window between submission of the questions and reception of the new answers.

2. The method of claim 1, wherein a triplet loss function based on answerers' ranking order and the temporal dynamics is employed to learn the answering behaviors of the answerers.

3. The method of claim 1, wherein the multi-shift extension models a temporal impact on neighboring time periods.

4. The method of claim 3, wherein the multi-resolution extension controls the temporal impact on both fine and coarse granularities.

5. The method of claim 1, wherein a ranking metric function is used to quantify a quality of an answerer of the answerers for a specific question.

6. The method of claim 5, wherein the ranking metric function is given as:

$$\sigma(Q,t,z) = (\text{Avg}_{pool}(Q) \oplus t) \cdot z^T,$$

where Q and t are encoding of a question content and question raising time, respectively, a temporal context-aware embedding of an answerer is denoted by z, and ⊕ is an operator for combining the question content and time.

7. The method of claim 1, wherein time encoding and question content encoding fed into a temporal context-aware attention component are combined to learn an attention between a question and an answerer of the answerers.

8. The method of claim 7, wherein the attention is applied to an answerer embedding to generate a temporal context-aware embedding.

9. The method of claim 1, wherein each answerer of the answerers is represented by an embedding matrix given as:

$$U \in \mathcal{R}^{p \times d},$$

where p is a hyper-parameter to control a scale of user expertise and d is a dimension for each user expertise.

10. A non-transitory computer-readable storage medium comprising a computer-readable program for employing a temporal context-aware question routing model (TCQR) in multiple granularities of temporal dynamics in community-based question answering (CQA) systems, wherein the computer-readable program when executed on a computer causes the computer to perform the steps of:
encoding previous answers of answerers into temporal context-aware representations based on semantic and temporal information of questions;
measuring answerers expertise in one or more of the questions as a coherence between the temporal context-aware representations of the answerers and encodings of the questions;
modeling the temporal dynamics of answering behaviors of the answerers in different levels of time granularities by using multi-shift and multi-resolution extensions; and
allocating the answerers more efficiently by finding and directing related questions of the questions to a pertinent answerer of the answerers such that new answers are provided faster and with less computational question routing resources to significantly reduce a time window between submission of the questions and reception of the new answers.

11. The non-transitory computer-readable storage medium of claim 10, wherein a triplet loss function based on answerers' ranking order and the temporal dynamics is employed to learn the answering behaviors of the answerers.

12. The non-transitory computer-readable storage medium of claim 10, wherein the multi-shift extension models a temporal impact on neighboring time periods.

13. The non-transitory computer-readable storage medium of claim 12, wherein the multi-resolution extension controls the temporal impact on both fine and coarse granularities.

14. The non-transitory computer-readable storage medium of claim 10, wherein a ranking metric function is used to quantify a quality of an answerer of the answerers for a specific question.

15. The non-transitory computer-readable storage medium of claim 14, wherein the ranking metric function is given as:

$$\sigma(Q,t,z) = (\text{Avg}_{pool}(Q) \oplus t) \cdot z^T,$$

where Q and t are encoding of a question content and question raising time, respectively, a temporal context-aware embedding of an answerer is denoted by z, and ⊕ is an operator for combining the question content and time.

16. The non-transitory computer-readable storage medium of claim 10, wherein time encoding and question content encoding fed into a temporal context-aware attention component are combined to learn an attention between a question and an answerer of the answerers.

17. The non-transitory computer-readable storage medium of claim 16, wherein the attention is applied to an answerer embedding to generate a temporal context-aware embedding.

18. The non-transitory computer-readable storage medium of claim 10, wherein each answerer of the answerers is represented by an embedding matrix given as:

$$U \in \mathcal{R}^{p \times d},$$

where p is a hyper-parameter to control a scale of user expertise and d is a dimension for each user expertise.

19. A system for employing a temporal context-aware question routing model (TCQR) in multiple granularities of temporal dynamics, the system comprising:
a memory; and
one or more processors in communication with the memory configured to:
encode previous answers of answerers into temporal context-aware representations based on semantic and temporal information of questions;
measure answerers expertise in one or more of the questions as a coherence between the temporal context-aware representations of the answerers and encodings of the questions;
model the temporal dynamics of answering behaviors of the answerers in different levels of time granularities by using multi-shift and multi-resolution extensions; and
allocate the answerers more efficiently by finding and directing related questions of the questions to a pertinent answerer of the answerers such that new answers are provided faster and with less computational question routing resources to significantly reduce a time window between submission of the questions and reception of the new answers.

20. The system of claim 19, wherein a triplet loss function based on answerers' ranking order and the temporal dynamics is employed to learn the answering behaviors of the answerers.

* * * * *